United States Patent
Dangelmayr et al.

[11] Patent Number: 6,073,551
[45] Date of Patent: Jun. 13, 2000

[54] PRESS HAVING A TRANSFER DEVICE FOR WORKPIECES

[75] Inventors: Andreas Dangelmayr, Ottenbach; Karl Thudium, Waeschenbeuren, both of Germany

[73] Assignee: Schuler Pressen GmbH & Co., Goeppingen, Germany

[21] Appl. No.: 09/083,977

[22] Filed: May 26, 1998

[30] Foreign Application Priority Data

May 23, 1997 [DE] Germany ........................... 197 21 613

[51] Int. Cl.⁷ .................................................. B30B 15/30
[52] U.S. Cl. .................. 100/207; 72/405.16; 198/621.3; 414/751
[58] Field of Search .................................. 100/207, 208; 72/405.09, 405.11, 405.12, 405.13, 405.16, 405.01; 198/621.1–621.4, 774.1–774.4; 414/751

[56] References Cited

U.S. PATENT DOCUMENTS

| | | |
|---|---|---|
| 3,010,587 | 11/1961 | Hollinger . |
| 4,557,370 | 12/1985 | Tanaka ................................. 72/405.16 |
| 4,875,931 | 10/1989 | Monteiro ............................. 72/405.16 |
| 4,887,446 | 12/1989 | Maher . |
| 5,520,502 | 5/1996 | Liljengren et al. ..................... 414/751 |
| 5,562,196 | 10/1996 | Zierpka et al. ....................... 72/405.16 |
| 5,803,231 | 9/1998 | Lauke ................................... 72/405.16 |

FOREIGN PATENT DOCUMENTS

| | | |
|---|---|---|
| 0 760 272 | 3/1997 | European Pat. Off. . |
| 195 06 079 | 8/1996 | Germany . |
| 59-197325 | 11/1984 | Japan . |

*Primary Examiner*—Stephen F. Gerrity
*Attorney, Agent, or Firm*—Evenson, McKeown, Edwards & Lenahan, P.L.L.C.

[57] ABSTRACT

A press has a transfer direction along which workpieces are transferred through machining stations by gripper rails. Two carriages are provided per gripper rail which can be moved transversely to the transfer direction toward and away from one another. Two parallel control arms are rotatably disposed on one carriage which, on the other end, are rotatably disposed on a support part. On the other carriage, a link is rotatably disposed which, on the other end, is applied at half length to a parallel control arm. The support part can be lifted vertically by the movement of the carriages.

3 Claims, 5 Drawing Sheets

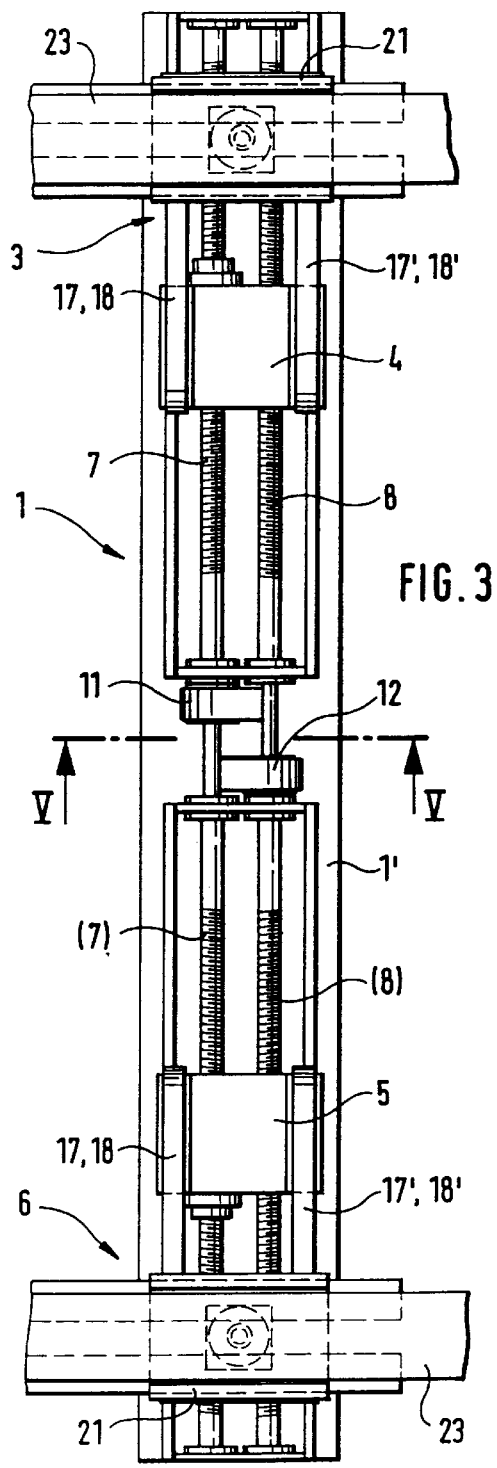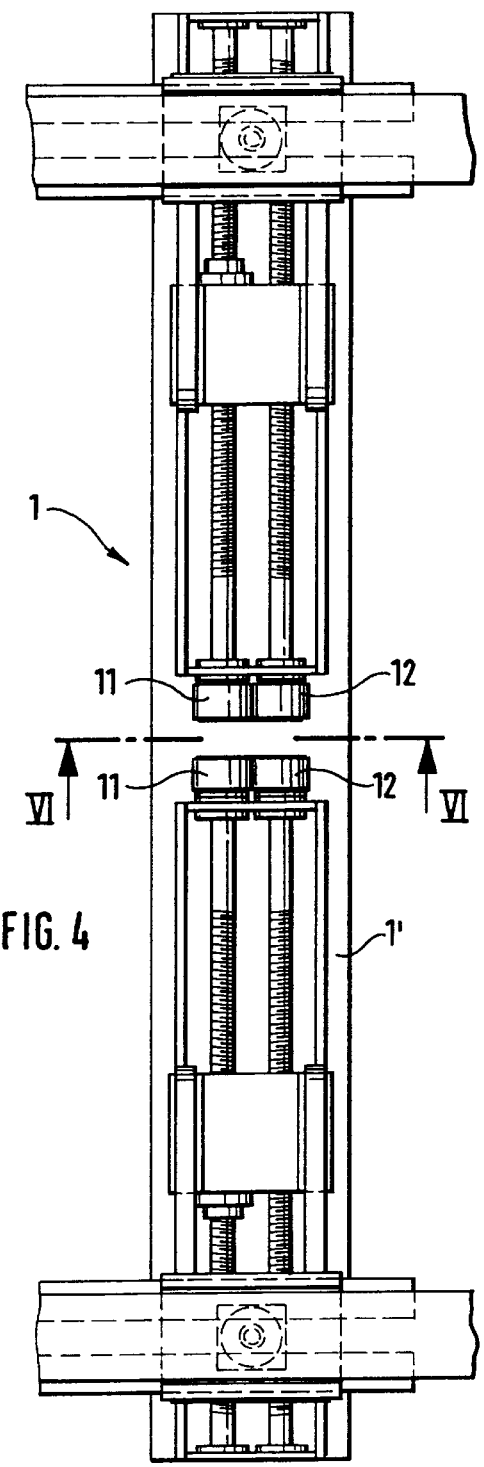
FIG. 3
FIG. 4

PRESS HAVING A TRANSFER DEVICE FOR WORKPIECES

BACKGROUND AND SUMMARY OF THE INVENTION

This application claims the priority of German application 197 21 613.7, filed May 23, 1997, the disclosure of which is expressly incorporated by reference herein.

The present invention relates to a press or a press arrangement having a transfer device for workpieces through the machining stations, driving and guiding devices for a gripper rail or for each of two gripper rails in the transfer, lifting/lowering, and optionally opening/closing movement axes.

Presses or press arrangements of the foregoing type have forming stations—machining stations—in which metal sheets are formed between mold halves by the movement of slides. The metal sheets, then constituting workpieces, are fed to the individual machining stations and are removed therefrom after forming. For this purpose, a transfer device which has driving and guiding devices for moving a gripper rail or generally two gripper rails in the axes of the transfer movement. The lifting and lowering movement, and, with a three-axis systems, also in the opening and closing movement.

The transmission of the lifting/lowering and opening/closing movements takes place in so-called closing boxes which are arranged, as it were, as "ground instruments" or as press-side devices in the area of the press stands but in each case must achieve the supporting of the gripper rails in areas which are remote from one another.

The use of direct driving devices, such as electric motors, on one hand, opens up new possibilities; mechanical devices for transmitting movements and for guiding moved parts are, on the other hand, absolutely necessary.

JP 59-197325 (A) shows a transfer device with motor drives for the transfer and the opening-closing movement. The lifting and lowering of the gripper rails would require separate measures or means. U.S. Pat. No. 3,010,587 shows a device for loading presses having an additional device for a vertical movement. A carriage can be moved horizontally toward and away from a fixed point. A link is rotationally movable on the carriage and, in its center area, is held by another link which is rotationally movable in the fixed point. The length of the pivot bearing in the fixed point to the bearing in the center point of this lever corresponds to half the length of the link disposed on the carriage. For avoiding the tilting of the table linked to this link, a second link system is required which has an identical construction.

EP 0 760 272 A1 also describes a positioning device with two carriages which can be moved in guides toward one another and away from one another. The carriages are movable by spindles rotationally driven by a motor and carry a pair of parallel control arms for the horizontal supporting of a table. The second carriage carries a control arm or a link which is also linked to the table. The control arms or links are rotationally movably disposed on the carriage and on the table. In order to be able to carry out an exactly vertically guided movement of the table, an absolute control of the motors rotationally driving the spindles is required in a reversible rotation.

An object of the invention is to adjust a gripper rail or, if present, two gripper rails in the many possibilities of basic adjustments and move them out of these basic adjustments, to achieve a precisely definable vertical movement.

This object has been achieved in accordance with the present invention by providing a transfer device in a press in which two carriages of a first and of a second type are assigned to a gripper rail or to each gripper rail if two gripper rails are used, and the carriages can be driven toward one another and away from one another, transversely to the actual transfer direction of the workpieces independently of one another. Two parallel control arms are rotatably disposed on a carriage of the first type and are rotatably disposed on the other end on a support part for a gripper rail. On the other carriage of the second type, a link is rotatably disposed which, on the other end, at half the length, is applied to one of the parallel control arms and is rotatably disposed there. The length of the link corresponds to half the length of the parallel control arm, relative to the spacing of their pivots. The support part is used directly as a longitudinal guide for a gripper rail, and if separate guiding devices are used, the support part is used indirectly for the bearing of the gripper rail.

One advantage of the present invention is the utilization of the upper support part as a direct bearing for the gripper rail or as an indirect part when additional bearing or guiding devices are used for the gripper rail. With respect to known closing-box solutions, however, the constructive measure of the bearing of spindles had to be carried out disadvantageously in the longitudinal course of the closing boxes.

Another advantageous feature of the present invention provides the advantage of common driving devices, in which case an option exists as to whether generally a drive should be provided for each spindle for the two carriages of a gripper rail.

Other advantageous aspects of the present invention are directed to a newly usable driving concept of the utilization of the linear motor principle. Although DE 195 06 079 A1 generally describes the linear motor principle with respect to the use for the movement axes of grippers on gripper rails, the present invention involves a recognition that this principle can also be used for the lifting and lowering of a guiding element for gripper rails by link control arms.

BRIEF DESCRIPTION OF THE DRAWINGS

Other objects, advantages and novel features of the present invention will become apparent from the following detailed description of the invention when considered in conjunction with the accompanying drawings wherein:

FIG. 3 is a top view of the closing box shown in FIG. 1;

FIG. 4 is a top view of a closing box of another embodiment of the present invention utilizing different driving devices;

DETAILED DESCRIPTION OF THE DRAWINGS

Presses and press arrangements have a number of closing boxes as parts of the transfer devices for the metal sheet or workpiece transport through the press.

Figure 1:
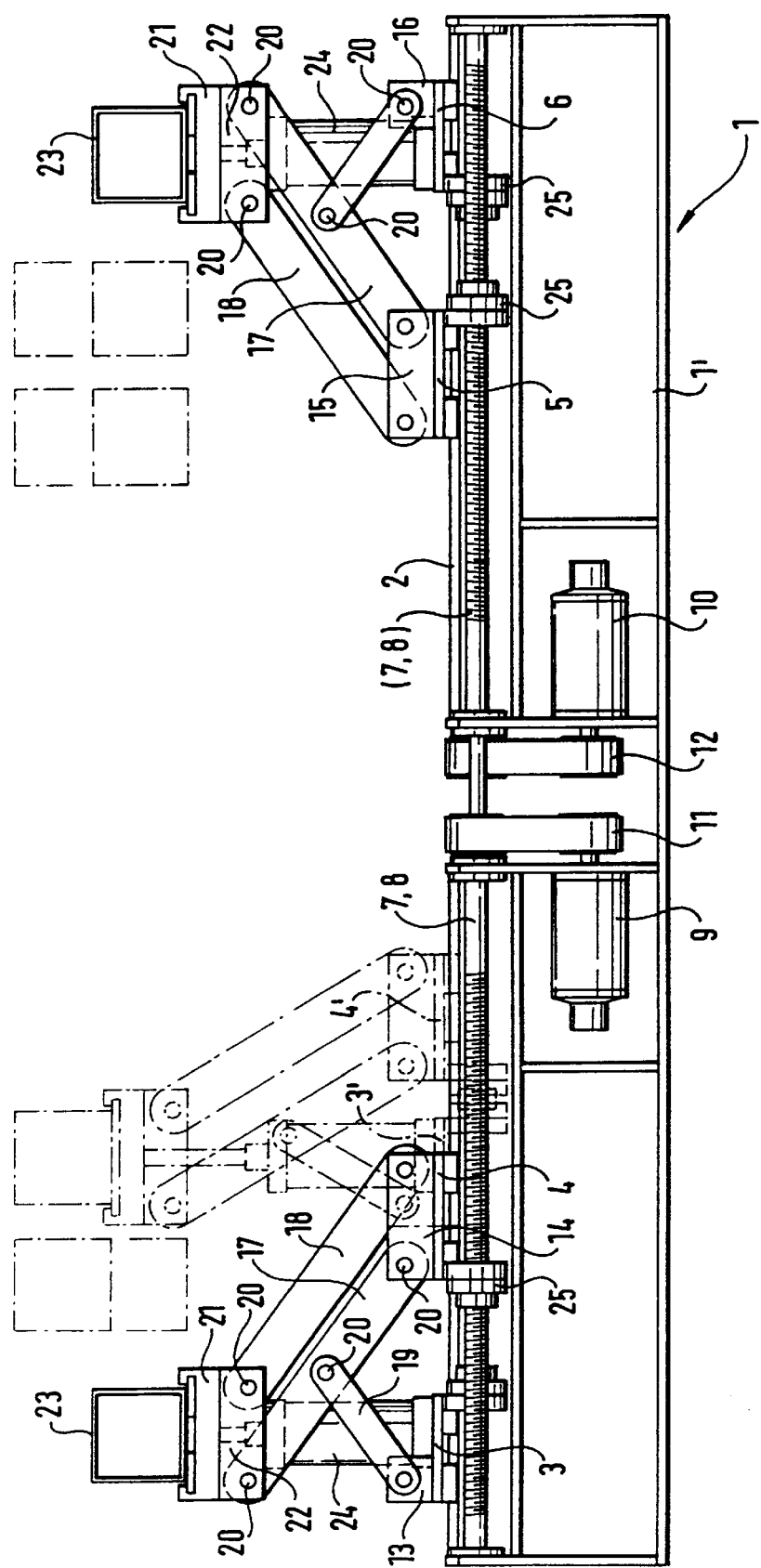
FIG. 1 is a view of a closing box of a press having devices according to one embodiment of the present invention.
Figure 2:
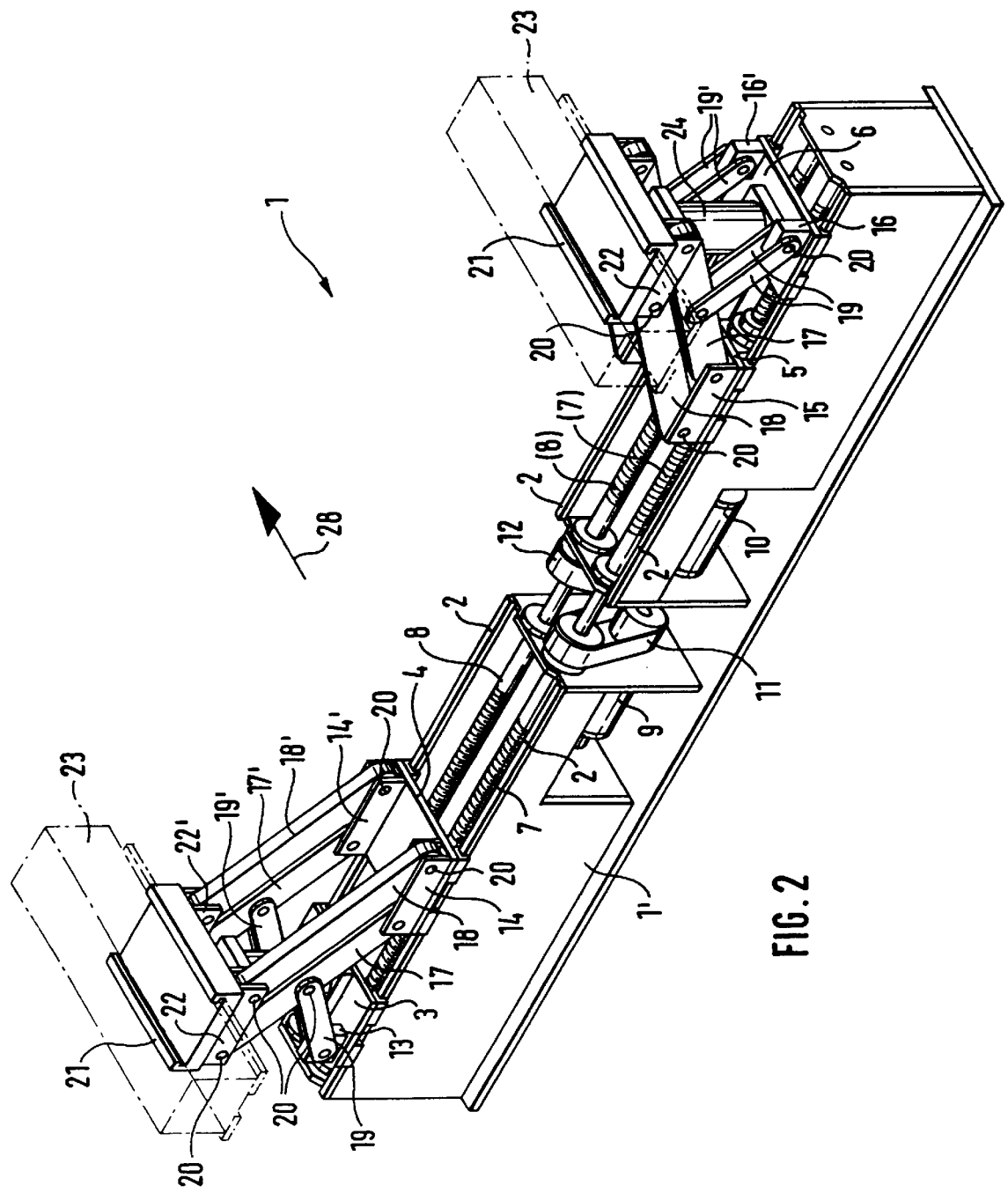
FIG. 2 is a perspective view of the closing box shown in FIG. 1.

With specific reference to FIGS. 1 and 2, the closing boxes 1 have a console 1' which can basically be a welded construction consisting of joined metal sheets, supports, web plates and belts. Guides 2 are provided which extend along the total length of the console 1' or over partial areas of this console 1'. The overall length of the console 1' results from the width or is dictated by of the press.

Carriages of a first type 4, 5 and carriages of a second type 3, 6 are slidably disposed in the guides 2. The carriages 3, 4 are assigned to a gripper rail 23 and the carriages 5, 6 are assigned to a second gripper rail 23. The gripper rails 23 carry holding devices for the sheet metal parts in a known manner and, in the transport direction of the workpieces— arrow 28 in FIG. 2—as required, can be moved toward one another and away from one another in a closing/opening movement and in the vertical direction for the lifting and lowering.

In the closing boxes 1 or the console 1' of FIGS. 1 to 6, spindles 7, 8 are rotationally movably disposed which extend parallel to the longitudinal course of the console 1' and its guides 2. The spindles 7, 8 in FIGS. 1, 2, 3 and 5 have right-hand left-hand threads and are rotationally driven by way of one toothed belt drive 11, 12 respectively by motors 9, 10 fixed on the console. The carriages 3, 4, 5, 6 are connected to the spindles by spindle nuts 25.

For balancing the weight of the gripper rails 23, each of the carriages 3, 6 have a pressure cylinder 24. The carriage 3 is provided with a bearing block 13 in which a link or double link 19 or a pair of links or a pair of double links 19, 19' is disposed in a swivellable manner. The carriage 6 has the same construction with the links 19, 19' disposed in the bearing block 16 or the bearing blocks 16, 16'. The carriage 4 has bearing blocks 14 and 14' in which parallel control arms 17, 18 and 17', 18' are respectively swivellably disposed.

It is understood and unnecessary to show that the carriage 5 has the same construction with the parallel control arms 17, 18, 17', 18' disposed in the bearing blocks 15 and 15'. By way of the end area facing away from the carriage, the links 19 or the link pairs 19, 19' on the carriages 3, 6 are each linked to one of the parallel control arms 17, 18, 17', 18', specifically on half of their effective total length. The end areas away from the carriage link the parallel control arms 17, 17', 18, 18' to bearing blocks 22, 22' of a support part 21. This support part is used directly as a guiding device or, when additional equipment is used, such as a separate bearing, for receiving or supporting the gripper rail 23 or a part thereof, if the gripper rail is divided. The pivots of the links and parallel control arms are generally positioned at the location designated by reference numeral 20.

Figure 5:
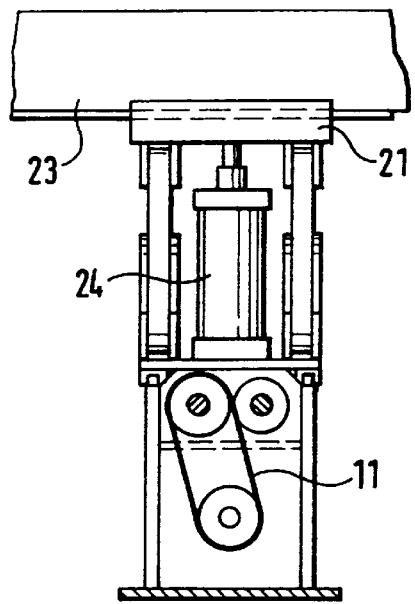
FIG. 5 is a view of driving devices of FIGS. 1, 2 and 3 along section line V—V in FIG. 3.
Figure 6:
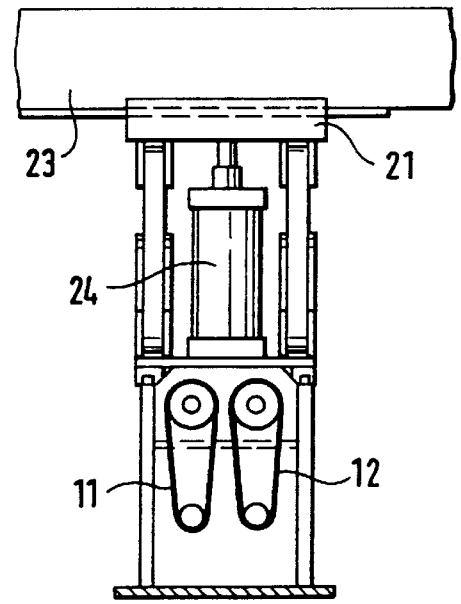
FIG. 6 is a view of the driving devices along section line VI—VI in FIG. 4.

While, in the embodiment according to FIGS. 1, 2, 3 and 5, the spindles 7, 8 extend along the total length of the console 1', the spindles 7, 8 in FIGS. 4 and 5 are divided. On one hand, additional toothed belt drives 11, 12 are required for this purpose; on the other hand, however, the carriages 3, 4 assigned to a gripper rail 23 are adjustable independently of the carriages 5, 6 of the other gripper rail 23 in order to thus cause different basic widths of the gripper rails 23 as well as different heights of these rails.

Figure 8:
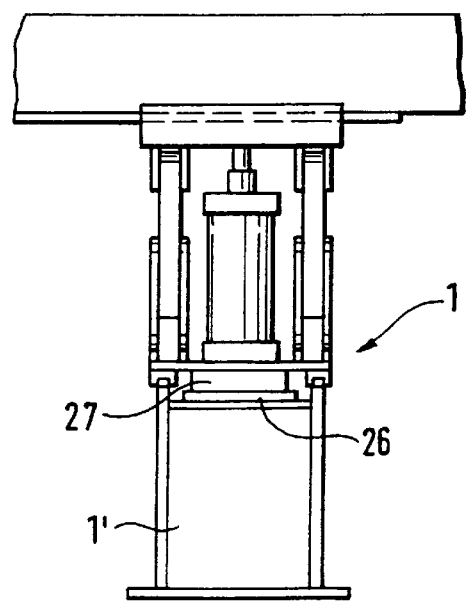
FIG. 8 is a view along section line VIII—VIII in FIG. 7.
Figure 7:
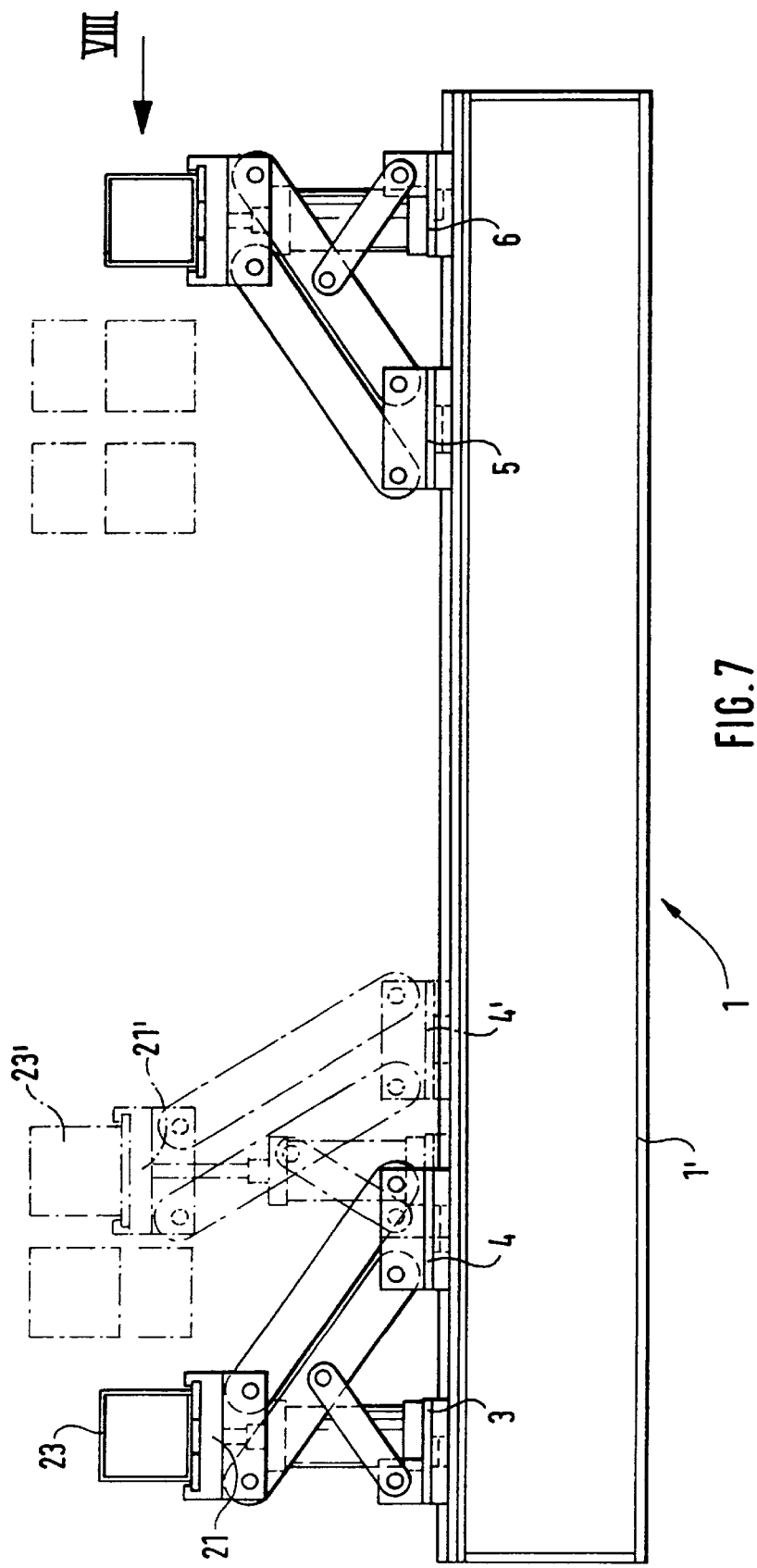
FIG. 7 is a view of another embodiment of a closing box with devices according to the present invention.

FIGS. 7 and 8 illustrate the use of the generally known linear motor principle. The secondary part is formed by superstructures 26 in the console 1'; the primary part is formed by superstructures 27 in the respective carriages 3, 4, 5, 6 of FIG. 7. The use of the linear motor principle for the transfer of workpieces has been described in U.S. Pat. No. 4,887,446 as well as in DE 195 06 079. Here, however, the principle is applied directly to the workpiece or to the holding device gripping it in a previously unrecognized manner with its consequent advantages.

The adjustment of the carriages 3, 4 and of the carriages 5, 6 by way of the toothed belt drive 11, 12 to the spindles 7, 8 toward one another and away from one another causes a lifting and lowering of the gripper rail 23 guided and supported on the supports 21. Thereby, the lifting-lowering movement is an absolutely vertical movement if only the carriages 4, 5 are moved, but the carriages 3, 6 are held. Furthermore, the movement of the gripper rails 23 toward one another and away from one another can be achieved by the joint adjustment of the carriages 3, 4 and 5, 6.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A press comprising a transfer device for transferring workpieces through machining stations of the press, driving and guiding devices for at least one gripper rail in at least two of transfer, lifting/lowering, and opening/closing movement axes, two carriages of a first type and of a second type operatively associated with each of the at least one gripper rail and being operatively configured to be driven toward and away from one another, transversely to an actual transfer direction of workpieces independently of one another, two parallel control arms rotatable disposed on the carriage of the first type, which parallel control arms are rotatable disposed on another end on a support part for a gripper rail, and, on the carriage of the second type, a link being rotatable disposed which, on another end, at half the length thereof, is operatively associated with one of the parallel control arms and rotatable disposed thereat, the link having a length corresponding to half the length of the parallel control arm, relative to the spacing of Divots thereof, and the support part being configured so as to constitute a direct longitudinal guide for the at least one gripper rail, and to be used as an indirect bearing for the at least one gripper rail with separate guiding devices, wherein two support parts are provided for receiving one of the at least one gripper rails respectively, and the carriages are arranged to be acted upon by motor driven joint spindles guided by way of the carriages to carry out essentially the length of an opening-closing movement.

2. The press according to claim 1, wherein the carriages are configured to be linear motor driven.

3. The press according to claim 2, wherein for linear motor driving the carriages are configured to have primary parts integrated therein, and a secondary part extends substantially along a length of the opening-closing movement.

* * * * *